(12) United States Patent
Gim et al.

(10) Patent No.: US 12,240,547 B2
(45) Date of Patent: Mar. 4, 2025

(54) VEHICLE BODY FOR VEHICLE

(71) Applicants: Hyundai Motor Company, Seoul (KR); Kia Corporation, Seoul (KR)

(72) Inventors: Seok Ju Gim, Seongnam-si (KR); Ji Ae Yong, Hwaseong-si (KR); Won Oh Kim, Ansan-si (KR); Mok Yeon Hong, Seoul (KR); Sun Hyung Cho, Suwon-si (KR); Chul Hee Heo, Hwaseong-si (KR); Ho Yeon Kim, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 351 days.

(21) Appl. No.: 17/880,270

(22) Filed: Aug. 3, 2022

(65) Prior Publication Data
US 2023/0249765 A1  Aug. 10, 2023

(30) Foreign Application Priority Data
Feb. 10, 2022 (KR) .................. 10-2022-0017494

(51) Int. Cl.
*B62D 63/02* (2006.01)
*B62D 25/04* (2006.01)
(Continued)

(52) U.S. Cl.
CPC .......... *B62D 63/025* (2013.01); *B62D 25/04* (2013.01); *B62D 25/087* (2013.01);
(Continued)

(58) Field of Classification Search
CPC ...... B62D 63/025; B62D 25/02; B62D 25/04; B62D 25/087; B62D 25/2027;
(Continued)

(56) References Cited

U.S. PATENT DOCUMENTS 5,879,042 A * 3/1999 DeRees .................. B62D 21/09
    296/29
6,299,244 B1 * 10/2001 Tarahomi ............... B62D 25/06
    296/210

(Continued)

FOREIGN PATENT DOCUMENTS

CN     109367622 A * 2/2019 ............... B60K 1/02
CN     210364132 U * 4/2020
(Continued)

OTHER PUBLICATIONS

Liu et al. (CN 112429116 A), machine translation (Year: 2021).*
European Patent Office, Extended European search seport for Application No. 22189369.6 dated May 30, 2023, 10 pages.

*Primary Examiner* — Amy R Weisberg
*Assistant Examiner* — Wenwei Zhuo
(74) *Attorney, Agent, or Firm* — Slater Matsil, LLP

(57) ABSTRACT

An embodiment vehicle body includes a drive vehicle body module configured to accommodate a driving part of a vehicle and including a first plurality of frames coupled together and fastening units provided at an upper end of the drive vehicle body module and an upper vehicle body module including a second plurality of frames coupled together, wherein a lower end of the upper vehicle body module is fastened to the fastening units of the drive vehicle body module to define an interior usage space of the vehicle.

15 Claims, 9 Drawing Sheets

(51) Int. Cl.
  *B62D 25/08* (2006.01)
  *B62D 25/20* (2006.01)
  *B62D 27/02* (2006.01)

(52) U.S. Cl.
  CPC ..... *B62D 25/2018* (2013.01); *B62D 25/2027* (2013.01); *B62D 25/2036* (2013.01); *B62D 27/023* (2013.01)

(58) Field of Classification Search
  CPC ............ B62D 25/2018; B62D 25/2036; B62D 27/023; B62D 27/06; B62D 27/065; B62D 65/04; B62D 24/00; B62D 23/005; B62D 33/00; B62D 21/02
  USPC .... 296/193.04, 193.03, 193.08, 193.09, 191, 296/203.01, 205, 204, 18, 2.1, 183.1
  See application file for complete search history.

(56) References Cited

U.S. PATENT DOCUMENTS

| | | | |
|---|---|---|---|
| 7,216,926 B2 * | 5/2007 | Hampel | B62D 33/0617 296/190.08 |
| 8,714,632 B2 * | 5/2014 | Chapman | A61G 3/00 296/205 |
| 2003/0038468 A1 | 2/2003 | Chernoff et al. | |
| 2003/0164255 A1 * | 9/2003 | Borroni-Bird | B62D 21/00 180/54.1 |
| 2007/0126200 A1 * | 6/2007 | Ogawa | B60G 7/00 280/124.128 |
| 2020/0086730 A1 | 3/2020 | Hara | |
| 2020/0369140 A1 | 11/2020 | McCarron et al. | |
| 2022/0017010 A1 | 1/2022 | Taniguchi | |
| 2024/0199151 A1 * | 6/2024 | Subramanian | B62D 63/025 |

FOREIGN PATENT DOCUMENTS

| | | | | |
|---|---|---|---|---|
| CN | 210680926 U | * | 6/2020 | |
| CN | 112429116 A | * | 3/2021 | ........... B62D 63/025 |
| CN | 114954662 A | * | 8/2022 | ............... B60K 1/04 |
| CN | 117864245 A | * | 4/2024 | |
| DE | 102019002569 A1 | * | 10/2019 | |
| JP | 2020044950 A | | 3/2020 | |
| KR | 102196298 B1 | | 12/2020 | |
| KR | 20210083533 A | | 7/2021 | |
| KR | 20210110668 A | | 9/2021 | |

* cited by examiner

VEHICLE BODY FOR VEHICLE

CROSS-REFERENCE TO RELATED APPLICATIONS

This application claims the benefit of Korean Patent Application No. 10-2022-0017494, filed on Feb. 10, 2022, which application is hereby incorporated herein by reference.

TECHNICAL FIELD

The present invention relates to a technology related to a vehicle body structure of a vehicle.

BACKGROUND

A general structure of a vehicle body is manufactured by machining and welding components through a pressing process using molds. For this reason, there is a problem in that a massive amount of investment is required for facilities such as pressing factories, vehicle body welding factories, and painting factories and a design degree of freedom is low.

In particular, in the case of the vehicle body in the related art, a large number of changes in design are required to manufacture a small number of products of various types. For this reason, there is a problem in that the number of molds is rapidly increased, which inevitably increases production costs.

Recently, it is necessary to simplify a process of manufacturing a vehicle and minimize a development period to meet customer needs and cope with quickly changing market environments in a timely manner.

Therefore, there is a need for a vehicle body structure capable of improving assembly properties of a vehicle body in a smart factory environment while coping with various types of designs.

In addition, recently, with the development of autonomous driving technologies, there is a need for a vehicle capable of transporting freight without requiring a driver to get in the vehicle. To reduce costs required to manufacture an autonomous vehicle in which the driver is not seated and to simplify a process of manufacturing the autonomous vehicle, there is a need for a vehicle capable of being manufactured in an environmentally friendly smart factory in which some components are modularized, and a vehicle body is assembled by mechanically assembling the modularized components of the vehicle by bolting or the like without requiring a pressing process, a vehicle body welding process, and a painting process.

The foregoing explained as the background is intended merely to aid in the understanding of the background of the present invention, and is not intended to mean that the present invention falls within the purview of the related art that is already known to those skilled in the art.

SUMMARY

The present invention relates to a technology related to a vehicle body structure of a vehicle. Particular embodiments relate to a technology related to a vehicle body structure of a vehicle that operates for the purpose of freight delivery, portable marketing, and the like. Some embodiments relate to a technology related to a vehicle body frame structure used to simplify a process of manufacturing a vehicle.

Embodiments of the present invention provide a vehicle body for a vehicle in which a drive vehicle body module and an upper vehicle body module are manufactured by using a plurality of pipes so that a length of the vehicle body may be easily changed, and a luggage module capable of supporting luggage and a panel assembly for defining an external appearance of the vehicle body are coupled by being fitted into the upper vehicle body module or coupled in an environmental-friendly coupling manner such as bolting or riveting.

Embodiments of the present invention provide a vehicle body for a vehicle, the vehicle body including a drive vehicle body module configured by coupling a plurality of frames, configured to accommodate a driving part of a vehicle, and having fastening units provided at an upper end thereof, and an upper vehicle body module configured by coupling a plurality of frames and having a lower end fastened to the fastening units of the drive vehicle body module to define an interior usage space of the vehicle, the upper vehicle body module having the lower end configured to be coupled to or separated from the fastening units.

The drive vehicle body module may include lower main members extending in a forward/rearward direction of the vehicle and configured to define an overall length of the vehicle and lower members configured as one or more pipes and coupled to the lower main members and the driving part, and the upper vehicle body module may include upper main members extending in the forward/rearward direction of the vehicle and configured to define the overall length of the vehicle and upper members configured as one or more pipes and connected to the upper main members to define a loading space for luggage.

The drive vehicle body module may include front and rear lower bodies configured by coupling the plurality of lower members and disposed symmetrically in the forward/rearward direction of the vehicle, the front and rear lower bodies being coupled to the driving part and coupled to each other laterally by means of the lower main members, and a lower auxiliary unit configured by coupling the plurality of lower members and configured to connect a lower side of the front lower body and a lower side of the rear lower body, and the lower members may include lower connection members configured to connect the lower auxiliary unit and the lower main members and connect the drive vehicle body module and the upper vehicle body module.

The upper vehicle body module may include an upper main body formed by connecting the upper members, which extend in the transverse direction of the vehicle, to the upper main members. The upper vehicle body module may include a plurality of pillar parts each having an arcuately bent shape having a central portion bent and protruding upward and two opposite ends connected to two opposite sides of the upper main body, the plurality of pillar parts being spaced apart from one another in a longitudinal direction, pillar part members each configured to connect two opposite sides of each of the bent pillar parts, upper connection members configured to connect the plurality of pillar parts, and pillar part auxiliary members configured to additionally connect the pillar parts and the upper main body.

An end of the lower main member, an end of the lower member, an end of the upper main member, and an end of the upper member may be opened, and the vehicle body may further include end patches coupled to close the end of the lower main member, the end of the lower member, the end of the upper main member, and the end of the upper member and configured to couple one or more pipes.

The end patch may be coupled to the lower main member, the lower member, the upper main member, or the upper member by welding so as to be spaced apart inward from the end of the lower main member, the end of the lower member, the end of the upper main member, or the end of the upper member, and a bead produced by welding may be positioned in a separation space formed as the end patch is spaced apart inward from the lower main member, the lower member, the upper main member, or the upper member.

The lower main member and the upper main member may be fastened to each other in an upward/downward direction by the fastening units.

The upper members may include upper cross members extending in a transverse direction of the vehicle and configured to connect two opposite ends of the pair of upper main members, the lower members may include lower cross members extending in the transverse direction of the vehicle and configured to connect two opposite ends of the pair of lower main members, and the upper cross members, which connect the two opposite ends of the upper main members, and the lower cross members, which connect the two opposite ends of the lower main members, may be disposed in an upward/downward direction.

The lower cross member may define an overall width of the drive vehicle body module, and the upper cross member may define an overall width of the upper vehicle body module.

The vehicle body may further include a panel assembly configured by coupling and fitting a plurality of panels, in which the panel assembly is positioned outside the drive vehicle body module or the upper vehicle body module and defines an external appearance of the vehicle.

The panel assembly may include an inner panel coupled to an outer side of the upper vehicle body module and configured by fitting and coupling the plurality of panels and an outer panel configured by fitting the plurality of panels and coupled to and fitted with an outer side of the inner panel to define the external appearance of the vehicle.

The inner panel may include a front inner panel and a rear inner panel respectively disposed at front and rear sides of the upper body, the front inner panel and the rear inner panel each including two parts divided at left and right sides and configured to be coupled to each other, and a first part and a second part of the front inner panel may be disposed in a direction intersecting a direction in which a first part and a second part of the rear inner panel are disposed.

The inner panel may include a pair of longitudinal inner panels extending in a longitudinal direction of the vehicle and configured to connect two opposite sides of a lower portion of the front inner panel and two opposite sides of a lower portion of the rear inner panel, and an intermediate inner panel disposed between the front inner panel and the rear inner panel and having an arcuate panel shape having a central portion protruding upward, the intermediate inner panel having two opposite ends respectively coupled to the longitudinal inner panels, and ends of the first and second parts of the front and rear inner panels, ends of the longitudinal inner panel, and ends of the intermediate inner panel may be connected to one another while overlapping one another.

According to the vehicle body for a vehicle according to embodiments of the present invention, the drive vehicle body module and the upper vehicle body module each are manufactured by using one or more pipes and coupled by mechanical coupling such as bolting or riveting, such that the vehicle body may be produced by a smart factory production system. Therefore, it is possible to reduce the investment in large-scale facilities, improve the production efficiency, and minimize the manufacturing costs.

In addition, the drive vehicle body module includes the pair of lower main members extending in the forward/rearward direction of the vehicle and disposed at the lateral sides. The upper vehicle body module includes the upper main members disposed at the lateral sides of the vehicle, extending in the forward/rearward direction of the vehicle, and fastened to the lower main members. The overall length of the vehicle may be flexibly adjusted by adjusting the length of the lower main member and the length of the upper main member. In addition, the drive vehicle body module and the upper vehicle body module may be conveniently fastened and separated by means of the fastening units, and various upper vehicle body modules may be coupled to the drive vehicle body module or replaced depending on the customer's requirement, thereby expanding the versatility of the vehicle.

In addition, the lower main member defining the overall length of the vehicle and the upper main member defining the overall length of the vehicle are coupled, thereby constituting the dual member. Therefore, a dual load path for distributing a load from the moment of an initial frontal collision may be implemented.

In addition, the lower cross members connect the two opposite ends of the lower main members defining the overall length of the vehicle, and the upper cross members connect the two opposite ends of the upper main members defining the overall length of the vehicle, such that the lower cross members and the upper cross members are vertically disposed at the two opposite ends of the lower main members and the two opposite ends of the upper main members, thereby improving the rigidity of the vehicle body.

In addition, the luggage module is coupled to the upper vehicle body module by mechanical coupling such as bolting or riveting. Therefore, it is possible to couple the luggage module in various shapes depending on the customer's requirement, and this coupling method may make it easy to separate the luggage module, thereby making it easy to maintain and replace the luggage module.

In addition, the panel assembly, which is coupled to the outer side of the drive vehicle body module and the outer side of the upper vehicle body module, is configured by coupling the plurality of panels. The inner panel is coupled to the upper vehicle body module by mechanical coupling such as bolting or riveting, and the outer panel is fastened to the inner panel by being fitted with the outer side of the inner panel by means of clips. Therefore, the coupling method is simplified, and the efficiency of the manufacturing process is improved. Since the panel assembly is configured by the plurality of panels, the manufacturing process is convenient in comparison with a case in which the panel assembly is configured by a single panel.

DETAILED DESCRIPTION OF ILLUSTRATIVE EMBODIMENTS

Figure 1:
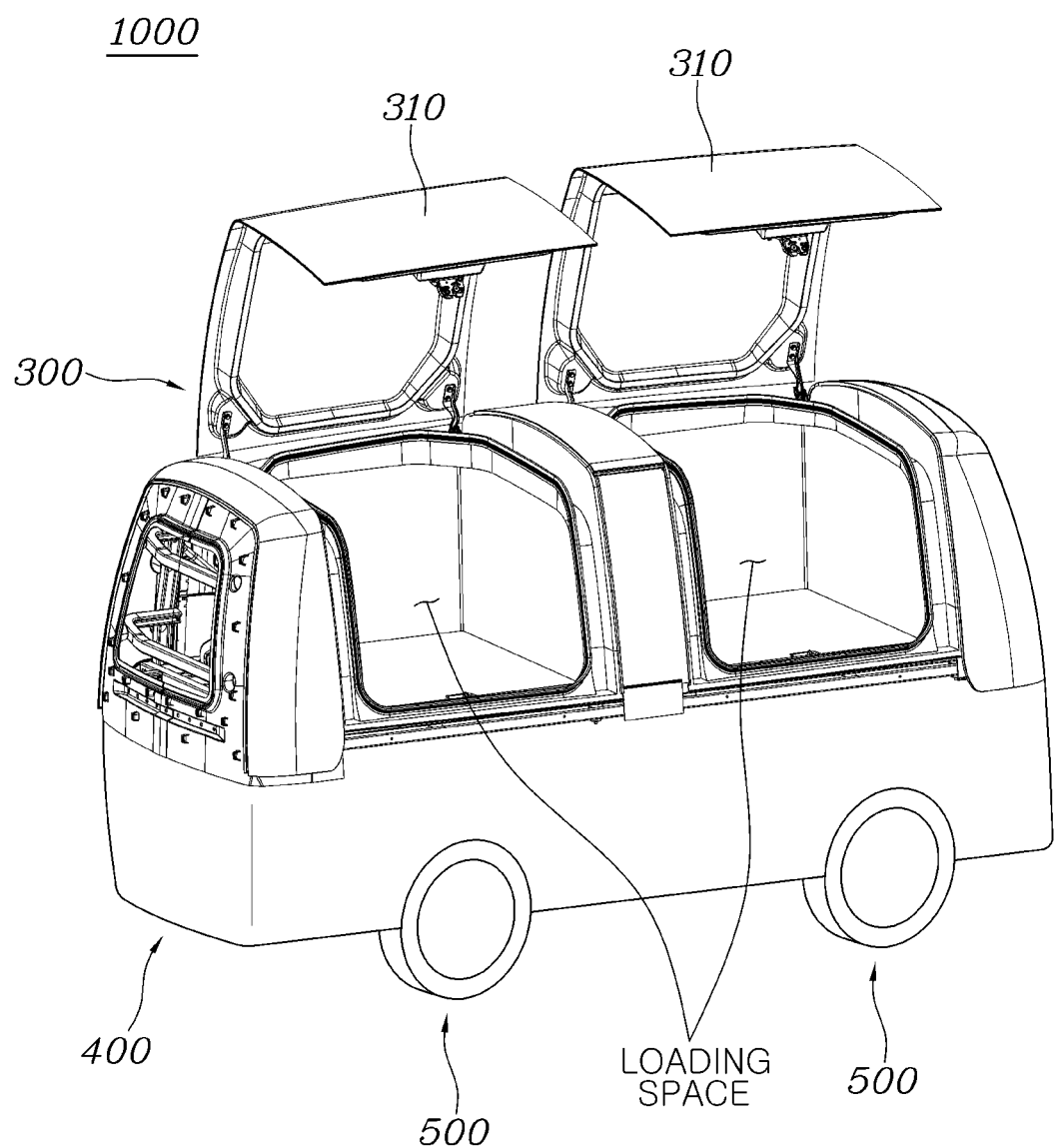
FIG. 1 is a perspective view of a vehicle body for a vehicle according to an embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and "second" may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

Figure 2:
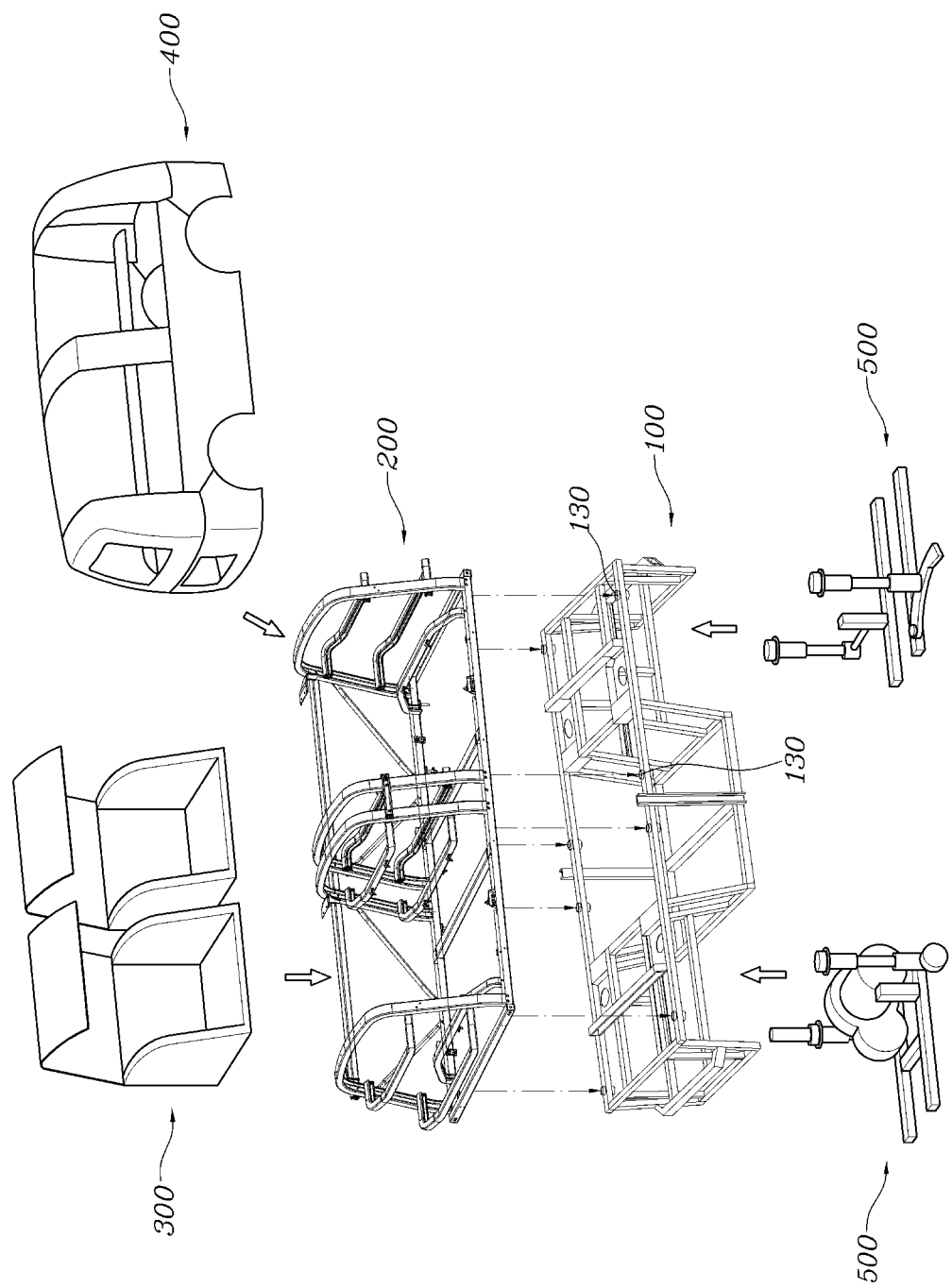
FIG. 2 is a view illustrating coupling of the vehicle body for a vehicle according to an embodiment of the present invention.
Figure 3:
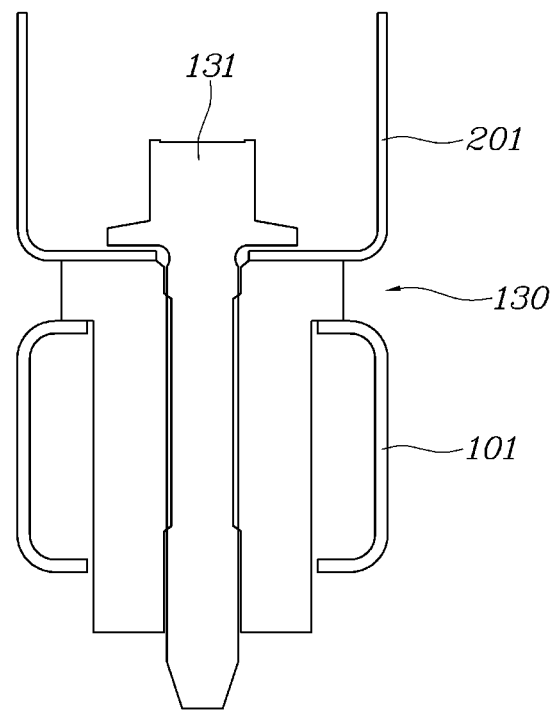
FIGS. 3 and 4 are views illustrating a fastening unit used to fasten a drive vehicle body module and an upper vehicle body module.
Figure 4:
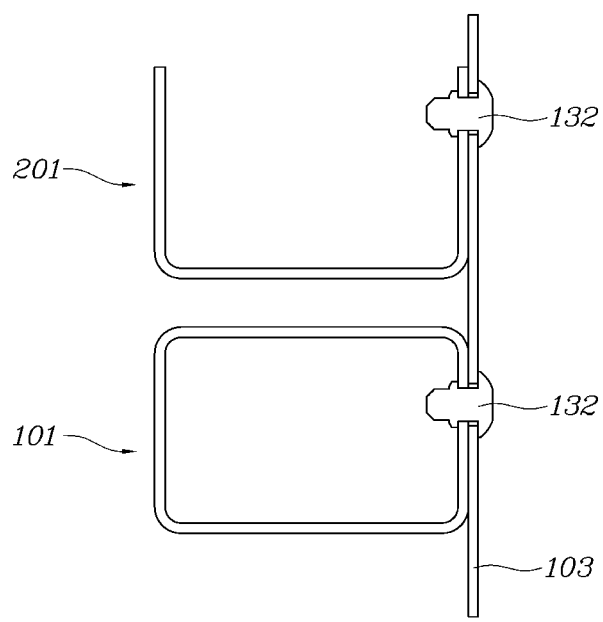
Figure 5:
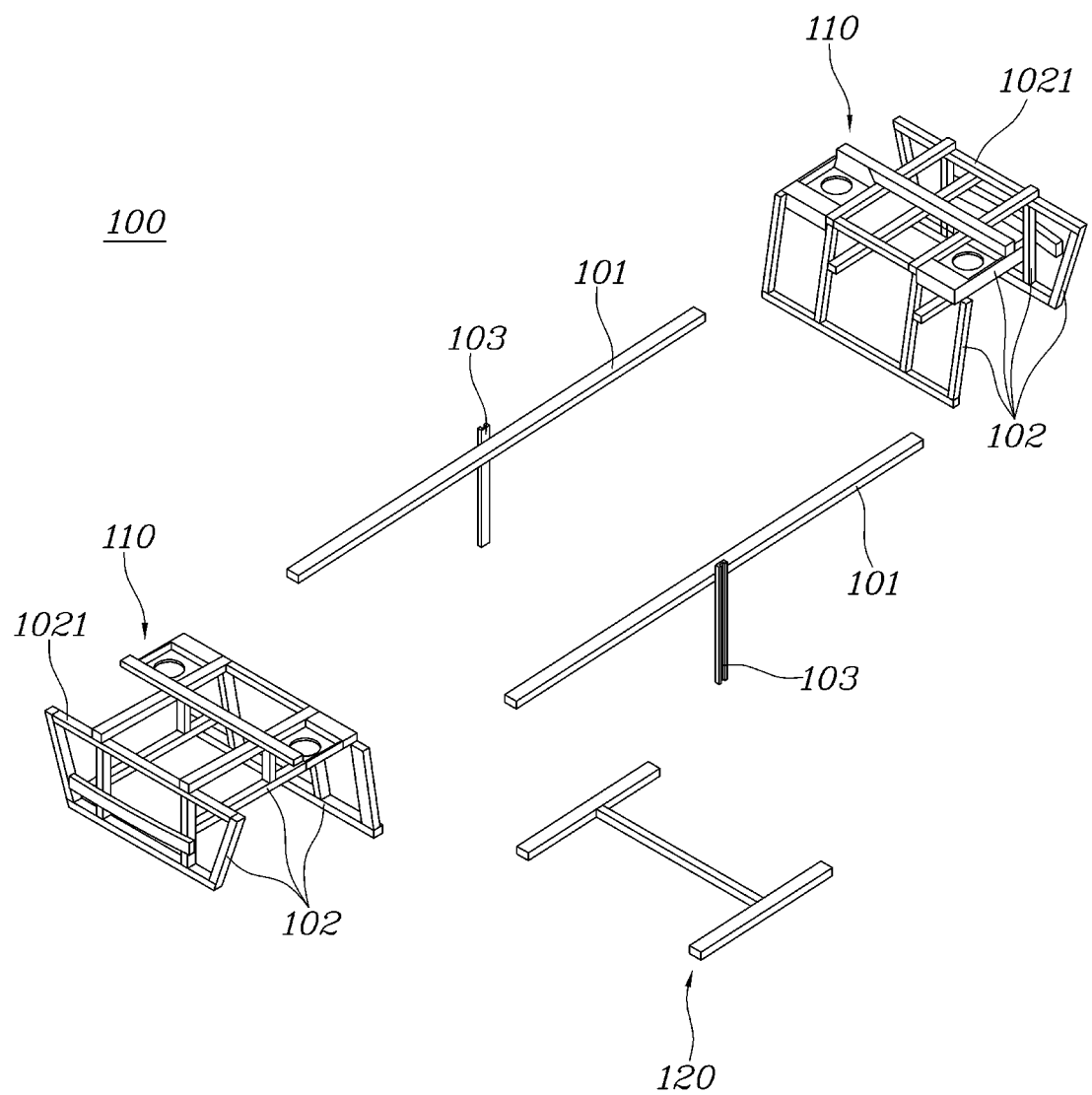
FIG. 5 is a perspective view of the drive vehicle body module of the vehicle body for a vehicle according to an embodiment of the present invention.
Figure 6:
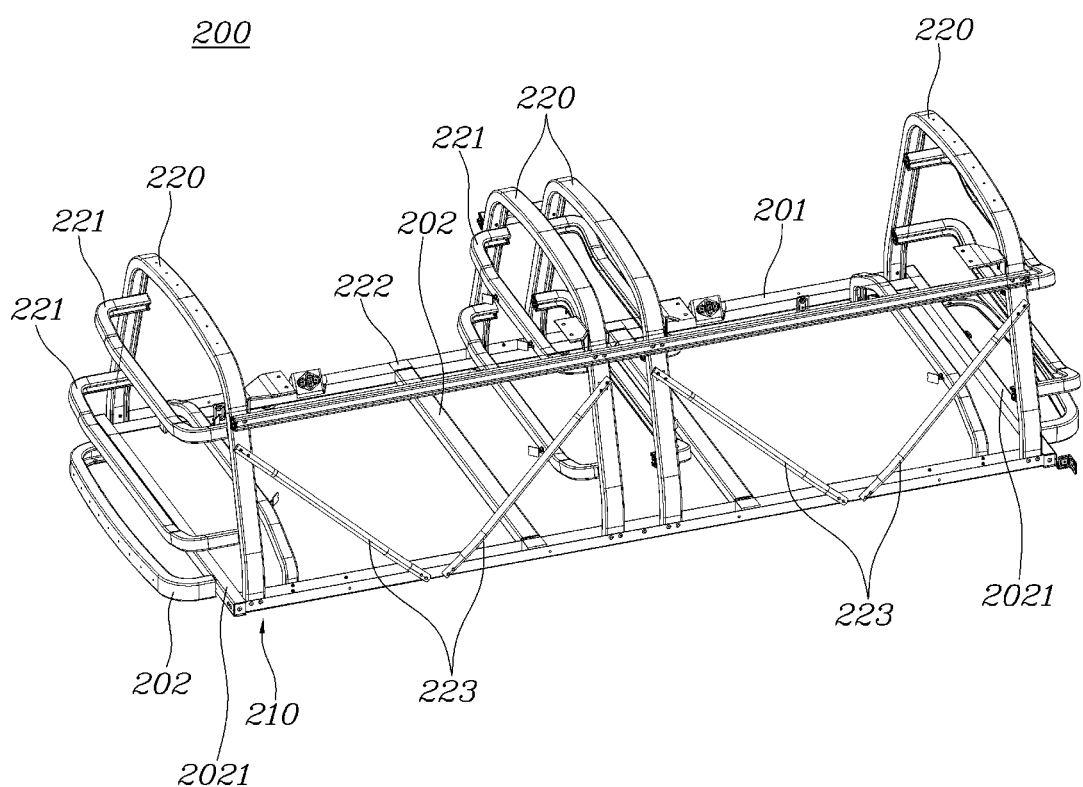
FIG. 6 is a perspective view of the upper vehicle body module of the vehicle body for a vehicle according to an embodiment of the present invention.
Figure 7:
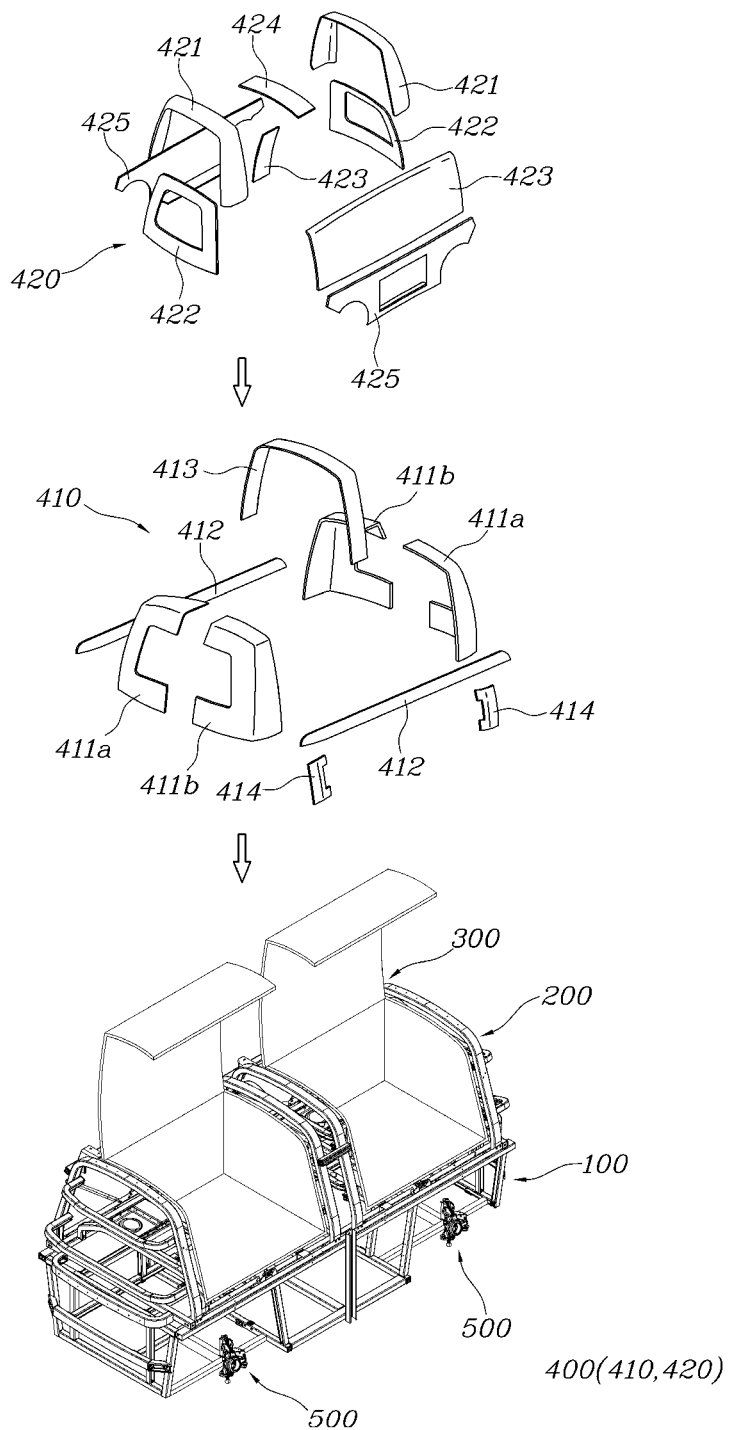
FIG. 7 is a view illustrating a state in which a panel assembly is coupled to the drive vehicle body module and the upper vehicle body module of the vehicle body for a vehicle according to an embodiment of the present invention.
Figure 8:
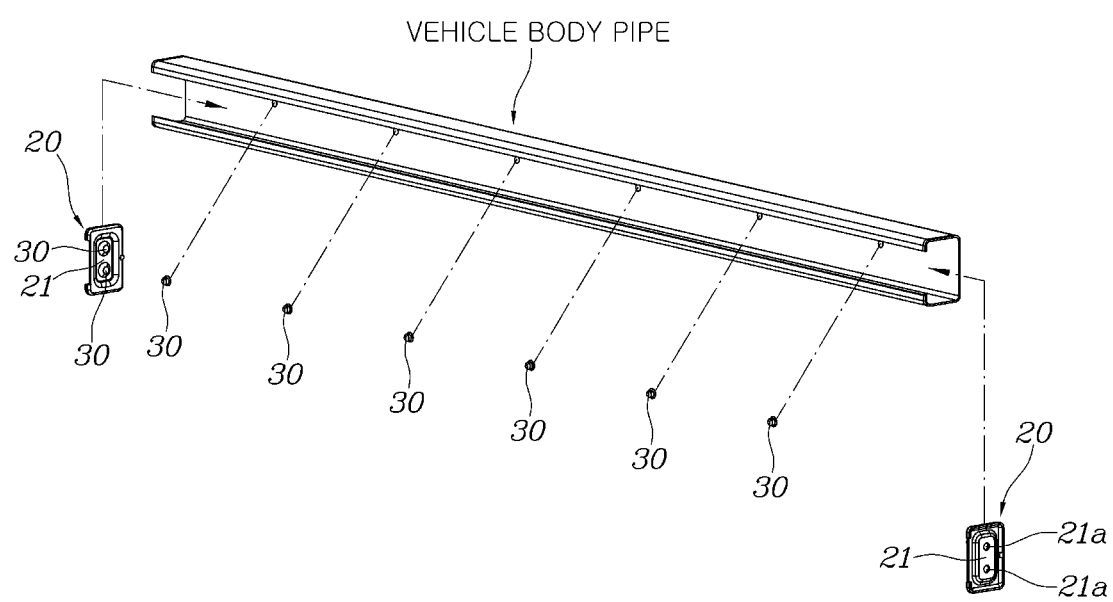
FIG. 8 is a view illustrating a state in which an end patch is coupled to a vehicle body pipe of the vehicle body for a vehicle according to an embodiment of the present invention.
Figure 9:
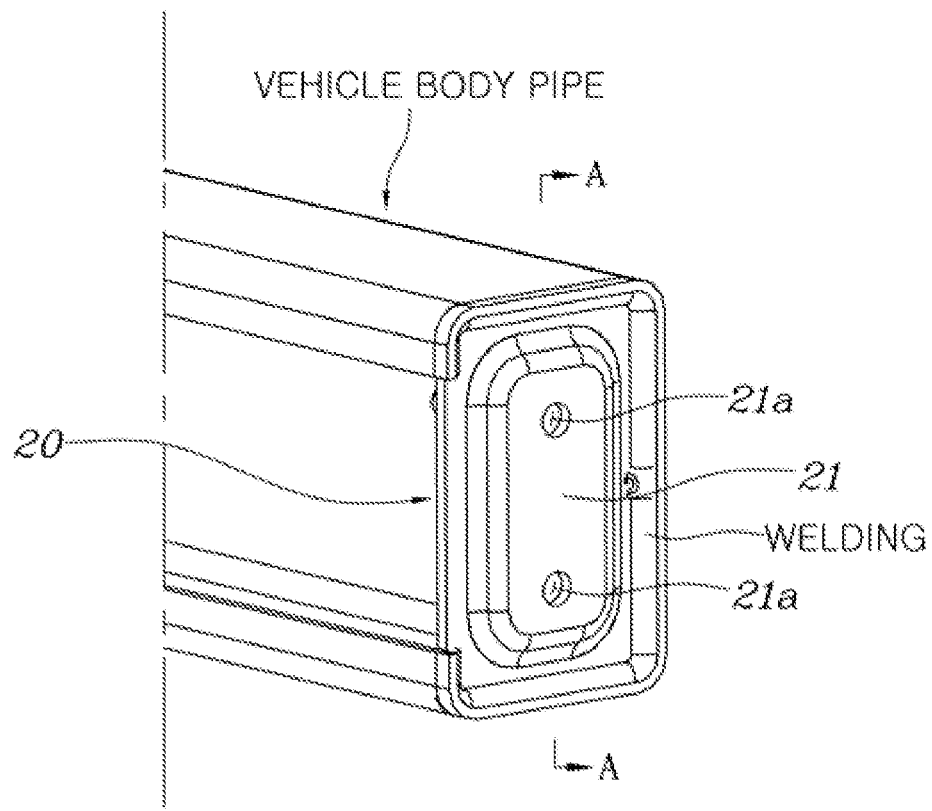
FIG. 9 is an enlarged view illustrating a state in which the end patch is coupled to the vehicle body pipe of the vehicle body for a vehicle according to an embodiment of the present invention.
Figure 10:
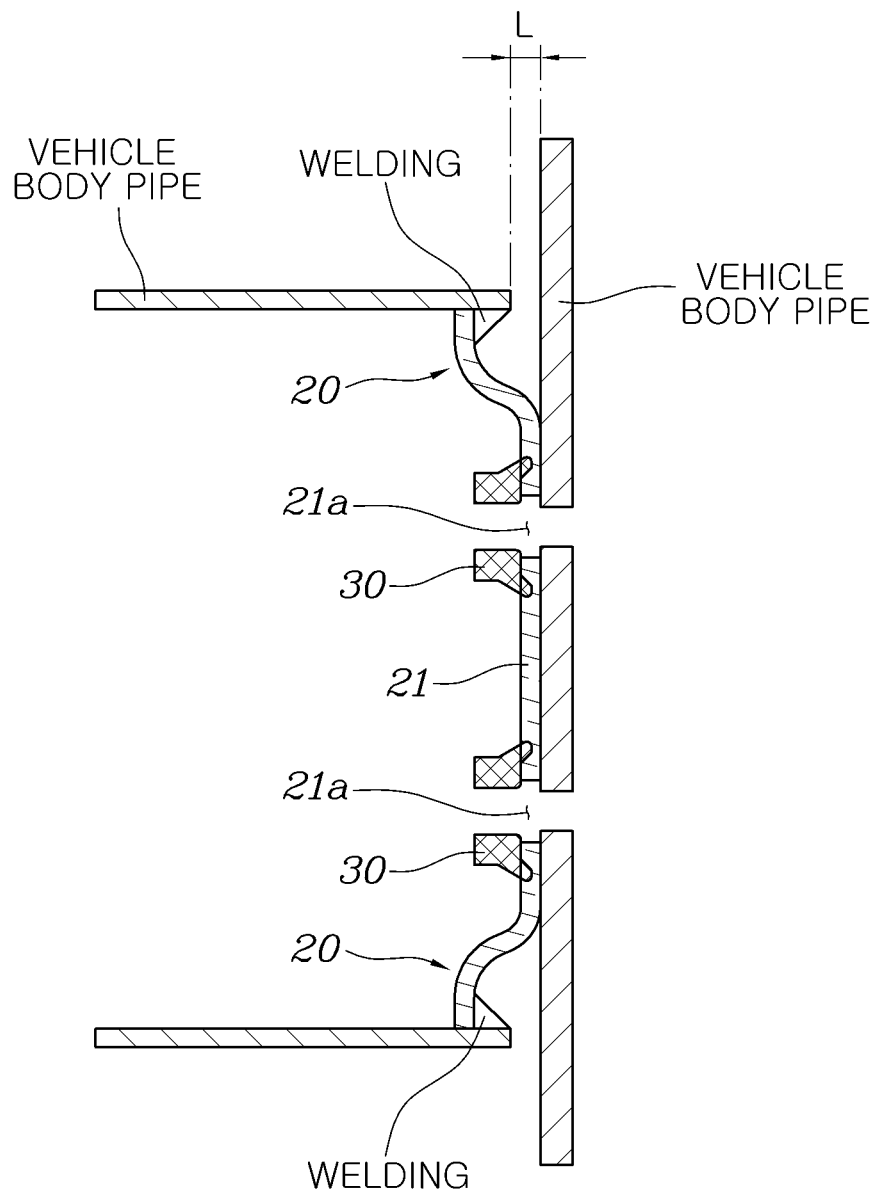
FIG. 10 is a cross-sectional view taken along line A-A in FIG. 9 and illustrating a state in which vehicle body pipes are coupled.

FIG. 1 is a perspective view of a vehicle body 1000 for a vehicle according to an embodiment of the present invention, FIG. 2 is a view illustrating coupling of the vehicle body 1000 for a vehicle according to an embodiment of the present invention, FIGS. 3 and 4 are views illustrating a fastening unit 130 used to fasten a drive vehicle body module 100 and an upper vehicle body module 200, FIG. 5 is a perspective view of the drive vehicle body module 100 of the vehicle body 1000 for a vehicle according to an embodiment of the present invention, FIG. 6 is a perspective view of the upper vehicle body module 200 of the vehicle body 1000 for a vehicle according to an embodiment of the present invention, FIG. 7 is a view illustrating a state in which a panel assembly 400 is coupled to the drive vehicle body module 100 and the upper vehicle body module 200 of the vehicle body 1000 for a vehicle according to an embodiment of the present invention, FIG. 8 is a view illustrating a state in which an end patch 20 is coupled to a vehicle body pipe of the vehicle body 1000 for a vehicle according to an embodiment of the present invention, FIG. 9 is an enlarged view illustrating a state in which the end patch 20 is coupled to the vehicle body pipe of the vehicle body 1000 for a vehicle according to an embodiment of the present invention, and FIG. 10 is a cross-sectional view taken along line A-A in FIG. 9 and illustrating a state in which vehicle body pipes are coupled.

The vehicle body 1000 for a vehicle according to exemplary embodiments of the present invention will be described with reference to FIGS. 1 to 10.

In the related art, a process of manufacturing a vehicle is performed for a comparatively long period of time and a large amount of manufacturing cost is required to provide the vehicle with a suspension for a vehicle, exterior components, interior components, a steering system, a safety device, and the like in consideration of convenience for passengers getting into the vehicle, ride quality for the passengers, safety specifications, external appearances, traveling performance, and the like. In addition, because separate vehicles suitable for various applications need to be manufactured, there is a problem in that it is impossible to manufacture customized vehicles suitable for all applications.

The vehicle, to which the technology according to embodiments of the present invention is applied, is a business vehicle, such as a purpose-built vehicle (PBV), used for various commercial purposes such as product distribution, food trucks, delivery, and service provision. In the case of the illustrated representative embodiments, passengers are not seated in the vehicle, but only freight is loaded into an internal space of the vehicle and transported. Further, the vehicle is driven by an autonomous driving system and used for unmanned delivery of freight or food, product distribution, and product delivery.

The vehicle according to embodiments of the present invention has a simplified structure, such that a process of designing and manufacturing the vehicle may be simplified. The advantage of the vehicle is that components of the vehicle may be modularized and used in common, such that costs may be reduced, a supply of components may be easily performed, and the vehicle may be completely manufactured by mechanically coupling the modularized components of the vehicle by bolting, riveting, or the like through production processes in an environmentally friendly smart factory without a pressing process, a vehicle body welding process, and a painting process.

Embodiments of the present invention relate to a method of simplifying a manufacturing process, excluding a welding process as much as possible, and manufacturing the vehicle body by using one or more pipes to reduce costs required to manufacture vehicle body members. The pipe may be manufactured by extrusion, roll-forming, or the like, and thus the manufacturing cost is advantageously low. However, it is necessary to reinforce coupling strength at the time of coupling the pipes or coupling the pipe and other panels. Therefore, according to embodiments of the present invention, a coupling member is applied to close an opened end of the pipe to firmly couple the end of the pipe to another pipe or the panel, such that the integration process may be simplified. According to the structure of embodiments of the present invention in which the pipe and the coupling member are integrated, the vehicle body may be easily assembled only by mechanical coupling such as bolting or riveting in the environmentally friendly smart factory, and the structure of embodiments of the present invention may be environmentally friendly because welding or the like is not needed. Some members of the vehicle body may be easily replaced in the event of accidents or maintenance, and various types of vehicles may be easily assembled and produced.

The vehicle body 1000 for a vehicle according to embodiments of the present invention may include frames of the vehicle and outer panels coupled to the frames.

Specifically, the vehicle body 1000 for a vehicle according to embodiments of the present invention includes the drive vehicle body module 100 configured by coupling a plurality of frames and configured to accommodate wheels, a chassis, and driving pails 500 of the vehicle, the drive vehicle body module 100 having fastening units 130 provided at an upper end thereof, and the upper vehicle body module 200 configured by coupling a plurality of frames and having a lower end fastened to the fastening units 130 of the drive vehicle body module 100 to define an interior usage space of the vehicle, the upper vehicle body module 200 having the lower end configured to be coupled to or separated from the fastening units 130.

As illustrated in FIGS. 1 and 2, in the vehicle body 1000 for a vehicle according to embodiments of the present invention, the drive vehicle body module 100 is disposed at a lower side of the vehicle and defines a lower vehicle body. The driving part 500 of the vehicle, which is configured to operate the vehicle, is coupled to a lower side of the drive vehicle body module 100, and the drive vehicle body module 100 accommodates the wheels or the chassis. The upper vehicle body module 200 is disposed at an upper side of the drive vehicle body module 100 and has the interior usage space in which luggage may be loaded or a passenger may be seated. The drive vehicle body module 100 and the upper vehicle body module 200 may be fastened to each other by means of the fastening units 130.

As illustrated in FIGS. 3 and 4, the frame of the vehicle may be divided into the drive vehicle body module 100 and the upper vehicle body module 200 which are separately manufactured. The fastening units 130 may be provided to integrally couple the two frames. The fastening unit 130 may include a pipe nut coupled to the upper side of the drive vehicle body module 100, and a bolt 131 coupled to the pipe nut while penetrating the upper vehicle body module 200.

With this simple coupling of the fastening unit 130, the drive vehicle body module 100 and the upper vehicle body module 200 may be simply coupled and disassembled. Therefore, the vehicle may be manufactured by coupling the upper vehicle body module 200 or the drive vehicle body module 100 in various combinations to meet the customer's needs.

The drive vehicle body module 100 may include lower main members 101 extending in a forward/rearward direction of the vehicle and configured to define an overall length of the vehicle and lower members 102 configured as one or more pipes and coupled to the lower main members 101 and the driving parts 500. The upper vehicle body module 200 may include upper main members 201 extending in the forward/rearward direction of the vehicle and configured to define the overall length of the vehicle and upper members 202 configured as one or more pipes and connected to the upper main members 201 to define a loading space for luggage.

As illustrated in FIG. 5, the drive vehicle body module 100 may include a pair of lower main members 101 configured as pipes, extending in the forward/rearward direction of the vehicle to define the overall length of the vehicle, and spaced apart from each other in a transverse direction of the vehicle. The one or more pipes may be connected to one another by means of the lower members 102 configured as one or more pipes connecting the lower main members 101.

The lower main member 101 may define the overall length of the drive vehicle body module 100, and the upper main member 201 may define the overall length of the upper vehicle body module 200.

In addition, as illustrated in FIG. 6, the upper vehicle body module 200 may include the pair of upper main members 201 configured as pipes and extending in the forward/rearward direction of the vehicle to define the overall length of the vehicle. The pair of upper main members 201 is spaced apart from each other in the transverse direction of the vehicle and disposed at the positions corresponding to the lower main members 101. The upper vehicle body module 200 may include the plurality of upper members 202 configured as pipes and configured to connect the upper main members 201.

The lower main member 101 and the upper main member 201 may be fastened to each other in an upward/downward direction by the fastening units 130.

As illustrated in FIG. 3, the lower main members 101 and the upper main members 201 may be fastened to each other by the fastening units 130 so that the drive vehicle body module 100 and the upper vehicle body module 200 may be coupled to each other. Therefore, the two vehicle body modules may be securely fastened to each other.

Therefore, the drive vehicle body module 100 and the upper vehicle body module 200 may be manufactured by using one or more pipes and an environmental-friendly manufacturing method such as bolting or riveting in a smart factory. Therefore, it is possible to simplify the manufacturing process, reduce the manufacturing costs, reduce the investment in large-scale facilities, and improve production efficiency.

In addition, the upper members 202 may extend in the transverse direction of the vehicle and connect two opposite ends of the pair of upper main members 201, and the lower members 102 may extend in the transverse direction of the vehicle and connect two opposite ends of the pair of lower main members 101. The upper members 202, which connect the two opposite ends of the upper main member 201, and the lower members 102, which connect the two opposite ends of the lower main member 101, may be fastened to one another in the upward/downward direction by the fastening units 130.

The upper members 202 may include upper cross members 2021 extending in the transverse direction of the vehicle and configured to connect the two opposite ends of the pair of upper main members 201. The lower members 102 may include lower cross members 1021 extending in the transverse direction of the vehicle and configured to connect the two opposite ends of the pair of lower main members 101. The upper cross members 2021, which connect the two opposite ends of the upper main members 201, and the lower cross members 1021, which connect the two opposite ends of the lower main members 101, may be disposed in the upward/downward direction.

Thereafter, the upper members 202 and the lower members 102 may be fastened to each other in the upward/downward direction by the fastening units 130 when the upper vehicle body module 200 and the drive vehicle body module 100 are fastened to each other by the fastening units 130. Therefore, it is possible to increase a fastening force between the upper vehicle body module 200 and the drive vehicle body module 100.

The drive vehicle body module 100 may include front and rear lower bodies no made by coupling the plurality of lower members 102 and disposed symmetrically in the forward/rearward direction of the vehicle, the front and rear lower bodies no being coupled to the driving pails 500 and coupled to each other laterally by means of the lower main members 101. The drive vehicle body module 100 may include a lower auxiliary unit 120 made by coupling the plurality of lower members 102 and configured to connect a lower side of the front lower body no and a lower side of the rear lower body 100. The lower members 102 may include lower connection members 103 configured to connect the lower auxiliary unit 120 and the lower main members 101 and connect the drive vehicle body module 100 and the upper vehicle body module 200.

As illustrated in FIG. 5, the front lower body no and the rear lower body no may be respectively provided at front and rear sides of the lower main members 101 and made by coupling the plurality of lower members 102. The pair of lower main members 101 may be coupled to the lateral side of the front lower body no and the lateral side of the rear lower body no and more effectively prepare for a collision. The overall length of the vehicle may be flexibly adjusted by adjusting the length of the lower main member 101.

The front lower body no and the rear lower body no have the same shape and are disposed symmetrically in the forward/rearward direction of the vehicle, which makes it possible to improve versatility and reduce the manufacturing costs during the process of manufacturing the vehicle.

In addition, the lower auxiliary unit 120 may be made by connecting the plurality of lower members 102 and may connect the lower side of the front lower body 110 and the lower side of the rear lower body 110. A length of the lower auxiliary unit 120 may be determined depending on the length of the lower main member 101. Components of a drive system, such as a battery of the vehicle, for operating the vehicle may be mounted on an upper side of the lower auxiliary unit 120. The lower auxiliary unit 120 may improve stability of the drive vehicle body module 100 and provide a skateboard platform disposed at the lower side of the vehicle and configured such that the driving parts 500 are provided thereon.

In addition, the lower members 102 may include the lower connection members 103 that serve to improve safety of the drive vehicle body module 100 and connect the lower auxiliary unit 120 and the lower main members 101. As illustrated in FIG. 4, an upper end of the lower connection member 103 is simultaneously fastened to the lower main member 101 and the upper main member 201 by rivets 132. Therefore, it is possible to improve fastening stability between the drive vehicle body module 100 and the upper vehicle body module 200.

The upper vehicle body module 200 includes an upper main body 210 formed by connecting the upper members 202, which extend in the transverse direction of the vehicle, to the upper main members 201. The upper vehicle body module 200 may include a plurality of pillar parts 220 each having an arcuately bent shape having a central portion bent and protruding upward and two opposite ends connected to two opposite sides of the upper main body 210, the plurality of pillar parts 220 being spaced apart from one another in a longitudinal direction, pillar part members 221 each configured to connect two opposite sides of each of the bent pillar parts 220, upper connection members configured to connect the plurality of pillar parts 220, and pillar part auxiliary members 223 configured to additionally connect the pillar parts 220 and the upper main body 210.

The upper vehicle body module 200 includes the upper main body 210 having the plurality of upper members 202 configured to connect the pair of upper main members 201 in the transverse direction of the vehicle. The upper main body 210 may be easily coupled to the upper side of the drive vehicle body module 100 by the fastening units 130.

In addition, the plurality of pillar parts 220 is provided on the upper main body 210 and bent upward. The plurality of pillar parts 220 may each have two opposite ends coupled to two opposite sides of the upper main body. The plurality of pillar parts 220 may be disposed in the forward/rearward direction of the vehicle and define a lateral member and a roof member of the vehicle. The pillar part members 221 each configured to connect the two opposite sides of each of the pillar parts 220 may be provided to improve rigidity of the pillar parts 220.

In addition, the upper vehicle body module 200 may further include pillar part connection members 222 configured to connect the plurality of pillar parts 220 to improve rigidity of the upper vehicle body module 200 and the pillar part auxiliary members 223 configured to additionally connect the pillar parts 220 and the upper main body 210. The pillar part connection members 222 and the pillar part auxiliary members 223 may be disposed at a side of a luggage module 300 at which no opening portion is provided.

An end of the lower main member 101, an end of the lower member 102, an end of the upper main member 201, and an end of the upper member 202 are opened, and the upper vehicle body module 200 may further include end patches 20 coupled to close the end of the lower main member 101, the end of the lower member 102, the end of the upper main member 201, and the end of the upper member 202 and configured to couple one or more pipes.

The lower main members 101 and the lower members 102, which are configured as one or more pipes, may be coupled to one another and constitute the drive vehicle body module 100, and the upper main members 201 and the upper members 202 may be coupled to one another and constitute the upper vehicle body module 200.

In this case, the end of the lower main member 101, the end of the lower member 102, the end of the upper main member 201, and the end of the upper member 202 are opened so that the ends of the vehicle body pipes constituting the vehicle body are coupled to other vehicle body pipes. The end patches 20 may be respectively coupled to the end of the lower main member 101, the end of the lower member 102, the end of the upper main member 201, and the end of the upper member 202 so as to close the ends, which makes it possible to conveniently couple the lower main member 101, the lower member 102, the upper main member 201, or the upper member 202 by bolting or riveting.

In addition, the vehicle body pipe may have coupling holes to which the end patch 20 is coupled. A welding nut 30 may be coupled to the coupling hole by welding to facilitate bolting.

The vehicle body pipes may include the lower main member 101, the lower member 102, the upper main member 201, and the upper member 202.

The end patch 20 may be coupled to the lower main member 101, the lower member 102, the upper main member 201, or the upper member 202 by welding so as to be spaced apart inward from the end of the lower main member 101, the end of the lower member 102, the end of the upper main member 201, or the end of the upper member 202. A bead produced by welding may be positioned in a separation space formed as the end patch 20 is spaced apart inward from the lower main member 101, the lower member 102, the upper main member 201, or the upper member 202.

The end patch 20 is coupled to the lower main member 101, the lower member 102, the upper main member 201, or the upper member 202 by welding so as to be spaced apart inward from the end of the lower main member 101, the end of the lower member 102, the end of the upper main member 201, or the end of the upper member 202. Therefore, since the welding bead is positioned in the separation space, it is not necessary to perform a process of removing the welding bead, and the manufacturing work may be simplified in comparison with the manufacturing process in the related art in which an end of a pipe is bent and welded and a welding bead is removed after the welding.

In addition, a coupling part 21 formed on the end patch 20 protrudes further than the end of the pipe and is coupled to another pipe, such that it is possible to minimize vibration or noise occurring on a coupling portion.

Through-holes 21a are penetratively formed in the coupling part 21, such that the pipes may be coupled by mechanical coupling including bolting or riveting. Therefore, the vehicle body may be completely manufactured by simply coupling the one or more pipes in the smart factory, such that the manufacturing costs may be reduced, and the manufacturing process may be simplified.

The vehicle body 1000 may further include luggage modules 300 coupled to the upper vehicle body module 200 and each having a loading space in which luggage may be loaded, the luggage modules 300 each having an opening portion opened in a lateral direction of the vehicle.

As illustrated in FIGS. 1 to 2, the upper vehicle body module 200 may have an opening portion formed in the lateral direction of the vehicle, and the luggage module 300 may be coupled in the opening portion of the upper vehicle body module 200. The luggage module 300 may have the loading space in which luggage may be loaded or a seating space in which a passenger may be seated.

The opening portion may be typically disposed to be directed toward a sidewalk from a driving road.

In embodiments of the present invention, the luggage module 300 is illustrated as having the shape having the loading space in which luggage may be loaded. However, the luggage module 300 may have various shapes suitable for the passenger's needs.

In addition, the luggage module 300 is coupled, by bolting or riveting, to the upper vehicle body module 200 configured by coupling the one or more pipes, such that the luggage module 300 may be flexibly coupled to or separated from the upper vehicle body module 200. Therefore, it is possible to easily maintain and repair the luggage module 300 and easily modify the luggage module 300 at the time of changing the purpose of use of the vehicle depending on the customer's needs.

The luggage module 300 may include cover units 310 coupled to be rotatable in a direction in which the opening portions of the luggage module 300 are opened so that the cover units 310 may open or close the opening portions.

As illustrated in FIGS. 1 to 2, the luggage module 300 may include the cover unit 310 configured to cover the opening portion. The cover unit 310 is coupled to be rotatable in the upward/downward direction from a lateral side of the luggage module 300. Therefore, the passenger may conveniently operate the cover unit 310 when the passenger is positioned on the sidewalk and opens the cover unit 310 to load luggage or closes the cover unit 310 after loading the luggage.

The vehicle body 1000 may further include a panel assembly 400 configured by coupling and fitting a plurality of panels. The panel assembly 400 is positioned outside the drive vehicle body module 100 or the upper vehicle body module 200 and defines an external appearance of the vehicle.

As illustrated in FIGS. 1, 2, and 7, the plurality of panels may be coupled to each other to define the external appearance of the vehicle in order to define the external appearances of the upper vehicle body module 200 and the drive vehicle body module wo configured by coupling the one or more pipes. The panel assembly 400 may be coupled by an environmental-friendly manufacturing method such as fitting, bolting, or riveting.

Therefore, the upper vehicle body module 200, the drive vehicle body module wo, and the panel assembly 400 may be easily manufactured in line in the environmental-friendly smart factory. Therefore, it is possible to simplify the production process and reduce the manufacturing costs.

The panel assembly 400 may include an inner panel 410 coupled to the outer side of the upper vehicle body module 200 and configured by fitting and coupling the plurality of panels and an outer panel 420 configured by fitting the plurality of panels and coupled to and fitted with an outer side of the inner panel 410 to define the external appearance of the vehicle.

As illustrated in FIG. 7, the inner panel 410 configured by coupling the plurality of panels may be fastened, by bolting or riveting, to the upper vehicle body module 200 configured by coupling the one or more pipes. The outer panel 420 configured by coupling the plurality of panels may be disposed outside the inner panel 410 and coupled to and fitted with the inner panel 410.

Although not illustrated in the drawings, the inner panel 410 and the outer panel 420 may be coupled to each other as first coupling portions protruding from an outer surface of the inner panel 410 and second coupling portions protruding from an inner surface of the outer panel 420 and configured to be coupled to the first coupling portions are fastened to one another. The first coupling portion and the second coupling portion may be coupled to each other by being fitted with each other by means of clips.

The inner panel 410 may include a front inner panel 411 and a rear inner panel 411 respectively disposed at front and rear sides of the upper body, and the front inner panel 411 and the rear inner panel 411 may each include two parts divided at left and right sides and configured to be coupled to each other. A first part 411a and a second part 411b of the front inner panel 411 may be disposed in a direction intersecting a direction in which a first part 411a and a second part 411b of the rear inner panel 411 are disposed.

In addition, the inner panel 410 may include a pair of longitudinal inner panels 412 extending in the longitudinal direction of the vehicle and configured to connect two opposite sides of a lower portion of the front inner panel 411 and two opposite sides of a lower portion of the rear inner panel 411 and an intermediate inner panel 413 disposed between the front inner panel 411 and the rear inner panel 411 and having an arcuate panel shape having a central portion protruding upward, the intermediate inner panel 413 having two opposite ends respectively coupled to the longitudinal inner panels 412. The ends of the first and second parts 411a and 411b of the front and rear inner panels 411, the ends of the longitudinal inner panel 412, and the ends of the intermediate inner panel 413 may be connected to one another while overlapping one another.

The inner panel 410 may include the front inner panel 411 and the rear inner panel 411 mounted at the front and rear sides of the vehicle, and the front inner panel 411 and the rear inner panel 411 may be configured as the same component, which may reduce manufacturing costs.

In addition, the front inner panel 411 and the rear inner panel 411 may each have the first part 411a and the second part 411b separated in the leftward/rightward direction of the vehicle. The first part 411a and the second part 411b are coupled to each other so that the ends thereof overlap each other, and then the first part 411a and the second part 411b are coupled to the upper vehicle body module 200, which may increase the coupling force. Further, the first parts 411a and the second parts 411b are disposed and coupled in the intersecting directions, and the pair of longitudinal inner panels 412 are coupled while overlapping the two opposite sides of the ends of the front inner panel 411 and the rear inner panel 411, which may increase the coupling force of the inner panel 410.

In addition, the intermediate inner panel 413 is bent upward and covers a roof part of the upper vehicle body module 200, and the two opposite ends of the intermediate inner panel 413 are connected to the longitudinal inner panels 412 while overlapping the longitudinal inner panels 412. Therefore, it is possible to implement an organic annular structure that prevents the front inner panel 411, the rear inner panel 411, the longitudinal inner panel 412, and the intermediate inner panel 413 from separating from one another, thereby increasing the coupling force of the inner panel 410.

In addition, the inner panel 410 may include auxiliary inner panels 414 configured to couple the front inner panel 411 and the rear inner panel 411 to the luggage module 300, which may increase the coupling force between the inner panel 410 and the luggage module 300.

In addition, since the inner panel 410 is configured by coupling the plurality of panels, the inner panel 410 may be easily manufactured and perfectly cover the upper vehicle body module 200.

The outer panel 420 may include a pair of first outer panels 421 disposed at front and rear sides of the inner panel 410 and coupled by loading from above to below the inner panel 410 so as to cover the roof and lateral parts thereof and a pair of second outer panels 422 configured to cover the front and rear sides of the inner panel 410 and each having an end connected to one side of each of the first outer panels 421.

As illustrated in FIG. 7, the pair of first outer panels 421 may be coupled in the forward/rearward direction of the vehicle to the outer panel 420 coupled to the outer side of the inner panel 410. The end of the second outer panel 422 may be coupled to the first outer panel 421. The second outer panels 422 may partially cover the roof part and the two opposite surfaces of the inner panel 410 and be coupled to the inner panel 410 while loading from above to below.

The second outer panels 422 may be coupled to the inner panel 410 first before the first outer panels 421 are coupled to the inner panel 410. At the same time when the first outer panels 421 are coupled to the front and rear sides of the inner panel 410, the ends of the second outer panels 422 are fitted with the ends of the first outer panels 421, such that the coupling may be completed.

Therefore, it is possible to remove a level difference between the plurality of outer panels 420 and prevent foreign substances such as rainwater from penetrating into the vehicle from the outside.

In addition, the first outer panels 421 and the second outer panels 422 are configured by the same components in the forward/rearward direction, which may reduce the manufacturing costs and simplify the manufacturing process.

The outer panel 420 may include lateral outer panels 423 configured to cover the lateral sides of the inner panel 410, a roof outer panel 424 configured to cover the roof part of the inner panel 410, and lower outer panels 425 connected to the inner panel 410 and configured to cover the drive vehicle body module 100.

As illustrated in FIG. 7, the lateral outer panels 423 may cover the lateral sides of the inner panel 410 and cover the lateral sides of the upper vehicle body module 200 at which no opening portion of the luggage module 300 is disposed, thereby defining the external appearance of the vehicle. The roof outer panel 424 may cover the roof part between the luggage modules 300 and connect the plurality of luggage modules 300, thereby preventing foreign substances from penetrating between the luggage modules 300 and the roof outer panels 424 from the outside. In addition, the lower outer panels 425 may be coupled to the inner panel 410 and cover the outer side of the drive vehicle body module 100, thereby defining the external appearance of the vehicle. The lower outer panels 425 may serve as bumpers of the vehicle.

According to the panel assembly 400, the respective panels are coupled to one another by fitting and coupled to the vehicle body by bolting or riveting. According to the assembly method, the respective panels are manufactured and transported to a smart factory, and the vehicles are manufactured by a simple coupling method such as fitting, bolting, or riveting in the smart factory without a manufacturing process such as a pressing process or a painting process and then delivered to customers. Therefore, it is possible to simplify the manufacturing process and minimize the manufacturing costs.

While the specific embodiments of the present invention have been illustrated and described above, it will be obvious to those skilled in the art that the present invention may be variously modified and changed without departing from the technical spirit of the present invention defined in the appended claims.

What is claimed is:

1. A vehicle body comprising:
a drive vehicle body module configured to accommodate a driving part of a vehicle and comprising a first plurality of frames coupled together and fasteners provided at an upper end of the drive vehicle body module; and
an upper vehicle body module comprising a second plurality of frames coupled together, wherein a lower end of the upper vehicle body module is fastened to the fasteners of the drive vehicle body module to define an interior usage space of the vehicle,
wherein the drive vehicle body module comprises:
lower main members extending in a forward/rearward direction of the vehicle and defining a length of the vehicle; and
lower members comprising one or more pipes, the lower members being coupled to the lower main members and the driving part,
wherein the drive vehicle body module comprises:
front and rear lower bodies comprising a first plurality of the lower members coupled together, the front and rear lower bodies being disposed symmetrically in the forward/rearward direction of the vehicle, being coupled to the driving part, and being coupled to each other laterally by the lower main members; and
a lower auxiliary unit comprising a second plurality of the lower members coupled together, wherein the lower auxiliary unit connects a lower side of the front lower body and a lower side of the rear lower body; and
wherein the lower members comprise lower connection members configured to connect the lower auxiliary unit and the lower main members and to connect the drive vehicle body module and the upper vehicle body module.

2. The vehicle body of claim 1, wherein the upper vehicle body module comprises:
upper main members extending in the forward/rearward direction of the vehicle and defining the length of the vehicle; and
upper members comprising one or more pipes, the upper members being connected to the upper main members to define a loading space for luggage.

3. The vehicle body of claim 2, wherein the upper vehicle body module comprises:
an upper main body formed by connecting upper cross members included in the upper members and extending in a transverse direction of the vehicle to the upper main members;
a plurality of pillar parts each having a central portion bent upward and two opposite ends connected to two opposite sides of the upper main body, the plurality of pillar parts being spaced apart from one another in a longitudinal direction;
pillar part members connecting two opposite sides of each of the plurality of pillar parts;
upper connection members connecting the plurality of pillar parts; and
pillar part auxiliary members additionally connecting the pillar parts and the upper main body.

4. The vehicle body of claim 2, wherein an end of each of the lower main members, an end of each of the lower members, an end of each of the upper main members, and an end of each of the upper members are opened, and the vehicle body further comprises end patches coupled to close the end of the lower main member, the end of the lower member, the end of the upper main member, and the end of the upper member and configured to couple one or more pipes.

5. The vehicle body of claim 4, wherein the end patch is coupled to the lower main member, the lower member, the upper main member, or the upper member by a weld so as to be spaced apart inward from the end of the lower main member, the end of the lower member, the end of the upper main member, or the end of the upper member.

6. The vehicle body of claim 5, wherein a bead of the weld is positioned in a separation space formed as the end patch is spaced apart inward from the lower main member, the lower member, the upper main member, or the upper member.

7. The vehicle body of claim 2, wherein the lower main member and the upper main member are fastened to each other in an upward/downward direction by the fasteners.

8. The vehicle body of claim 2, wherein:
the upper members comprise upper cross members extending in a transverse direction of the vehicle and connecting two opposite ends of the upper main members;
the lower members comprise lower cross members extending in the transverse direction of the vehicle and connecting two opposite ends of the lower main members; and
the upper cross members connecting the two opposite ends of the upper main members and the lower cross members connecting the two opposite ends of the lower main members are disposed in an upward/downward direction.

9. The vehicle body of claim 8, wherein the lower cross members define a width of the drive vehicle body module, and the upper cross members define a width of the upper vehicle body module.

10. A vehicle body comprising:
a drive vehicle body module configured to accommodate a driving part of a vehicle and comprising a first plurality of frames coupled together and fasteners provided at an upper end of the drive vehicle body module;
an upper vehicle body module comprising a second plurality of frames coupled together, wherein a lower end of the upper vehicle body module is fastened to the fasteners of the drive vehicle body module to define an interior usage space of the vehicle; and
a panel assembly positioned outside the drive vehicle body module or the upper vehicle body module and defining an external appearance of the vehicle, wherein the panel assembly comprises a plurality of panels coupled and fitted together;

wherein the drive vehicle body module comprises:
lower main members extending in a forward/rearward direction of the vehicle and defining a length of the vehicle; and
lower members comprising one or more pipes, the lower members being coupled to the lower main members and the driving part,
wherein the drive vehicle body module comprises:
front and rear lower bodies comprising a first plurality of the lower members coupled together, the front and rear lower bodies being disposed symmetrically in the forward/rearward direction of the vehicle, being coupled to the driving part, and being coupled to each other laterally by the lower main members; and
a lower auxiliary unit comprising a second plurality of the lower members coupled together, wherein the lower auxiliary unit connects a lower side of the front lower body and a lower side of the rear lower body; and
wherein the lower members comprise lower connection members configured to connect the lower auxiliary unit and the lower main members and to connect the drive vehicle body module and the upper vehicle body module.

11. The vehicle body of claim 10, wherein the panel assembly comprises:
an inner panel coupled to an outer side of the upper vehicle body module; and
an outer panel coupled to and fitted with an outer side of the inner panel to define the external appearance of the vehicle.

12. The vehicle body of claim 11, wherein the inner panel comprises a front inner panel and a rear inner panel respectively disposed at front and rear sides of the upper vehicle body module, the front inner panel and the rear inner panel each comprising two parts divided at left and right sides and coupled to each other.

13. The vehicle body of claim 12, wherein the two parts of the front inner panel are disposed in a direction intersecting a direction in which the two parts of the rear inner panel are disposed.

14. The vehicle body of claim 13, wherein the inner panel comprises:
a pair of longitudinal inner panels extending in a longitudinal direction of the vehicle and connecting two opposite sides of a lower portion of the front inner panel and two opposite sides of a lower portion of the rear inner panel; and
an intermediate inner panel disposed between the front inner panel and the rear inner panel and having an arcuate panel shape having a central portion protruding upward, the intermediate inner panel having two opposite ends respectively coupled to the longitudinal inner panels.

15. The vehicle body of claim 14, wherein ends of the two parts of the front inner panel, ends of the two parts of the rear inner panel, ends of the longitudinal inner panels, and ends of the intermediate inner panel are connected to one another while overlapping one another.

\* \* \* \* \*